United States Patent
Sugawara et al.

(10) Patent No.: US 10,239,252 B2
(45) Date of Patent: Mar. 26, 2019

(54) TANK PRODUCTION SYSTEM AND METHOD

(71) Applicant: TOYOTA JIDOSHA KABUSHIKI KAISHA, Toyota-shi (JP)

(72) Inventors: Kazuto Sugawara, Toyota (JP); Norihito Sakakibara, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/924,750

(22) Filed: Mar. 19, 2018

(65) Prior Publication Data

US 2018/0281271 A1   Oct. 4, 2018

(30) Foreign Application Priority Data

Mar. 30, 2017 (JP) ................................. 2017-067705

(51) Int. Cl.
  *B29C 53/80* (2006.01)
  *B29C 53/60* (2006.01)
  *F17C 1/06* (2006.01)
  *B29C 53/82* (2006.01)

(52) U.S. Cl.
  CPC ........ *B29C 53/8041* (2013.01); *B29C 53/602* (2013.01); *B29C 53/824* (2013.01); *F17C 1/06* (2013.01); *F17C 2203/0604* (2013.01)

(58) Field of Classification Search
  CPC . B29C 53/602; B29C 53/8041; B29C 53/824; B29C 53/562; F17C 1/06; F17C 2203/0604
  See application file for complete search history.

(56) References Cited

U.S. PATENT DOCUMENTS

| 3,276,647 | A | * | 10/1966 | Lewis, Jr. | ............... | B41F 13/02 101/228 |
| 4,702,555 | A | * | 10/1987 | Iguma | ................. | G11B 7/0932 336/198 |
| 7,331,436 | B1 | * | 2/2008 | Pack | .................... | B65H 75/425 191/12.2 A |
| 2015/0153002 | A1 | | 6/2015 | Tanabe | | |
| 2018/0159455 | A1 | * | 6/2018 | Pietromonaco | ........ | H02K 11/21 |

FOREIGN PATENT DOCUMENTS

JP    2015-107574    6/2015

* cited by examiner

*Primary Examiner* — Emmanuel M Marcelo
(74) *Attorney, Agent, or Firm* — Oblon, McClelland, Maier & Neustadt, L.L.P.

(57) ABSTRACT

A tank production system and method that can suppress peeling of normally wound fibers when fibers not wound at predetermined position are peeled off. The system includes a rotation unit that rotates a liner, a storage unit that has recorded thereon the number of revolutions of the liner, and a detection unit that detects abnormality in the position of the fibers wound on the outer periphery of the liner. The rotation unit, when abnormality in the position of the fibers is detected by the detection unit, refers to the number of revolutions of the liner recorded on the storage unit and rotates the liner in an opposite direction to the direction in which the fibers are wound, back to the number of revolutions of the liner at a point when the winding of fibers to form a fiber layer, which includes the fibers detected at the abnormal position, has started.

4 Claims, 4 Drawing Sheets

TANK PRODUCTION SYSTEM AND METHOD

CROSS REFERENCE TO RELATED APPLICATIONS

The present application claims priority from Japanese patent application JP 2017-67705 filed on Mar. 30, 2017, the content of which is hereby incorporated by reference into this application.

BACKGROUND

Technical Field

The present disclosure relates to a tank production system and method.

Background Art

Conventionally, inventions related to tank production methods and systems have been known (see JP 2015-107574 A). The conventional tank production system described in JP 2015-107574 A is a system for producing a tank in which fibers are wound on the outer periphery of a liner (see claim 5 and the like of the document). The conventional tank production system includes a heater, a winder, an acquirer, and a detector.

The heater heats fibers. The winder winds the heated fibers on the outer periphery of the liner. The acquirer acquires the temperature of the fibers wound on the outer periphery of the liner. The detector detects the position of the fibers wound on the outer periphery of the liner relative to the liner on the basis of the obtained temperature of the fibers wound on the outer periphery of the liner.

According to the conventional tank production system, the position of the fibers wound on the outer periphery of the liner can be detected on the basis of the temperature of the fibers by the acquirer and the detector during production of the tank. Therefore, the position of the fibers wound on the outer periphery of the liner can be detected with high accuracy. In addition, even when fibers are wound in layers, the position of newly wound fibers relative to the liner can be detected with high accuracy on the basis of the temperature difference between the fibers that have been already wound on the outer periphery of the liner and the newly wound fibers.

SUMMARY

According to the aforementioned conventional tank production system and method, when fibers of an (n+1)-th layer are not at a predetermined position, such fibers are peeled off from the liner (see paragraph 0033, FIG. 2, and step S70 of JP 2015-107574 A). Specifically, the winding of fibers on the outer periphery of the liner is stopped and an operator, for example, peels the fibers of the (n+1)-th layer off from the liner. However, since the operator is not sure about the correct amount of fibers to be peeled off from the liner, he/she may also peel fibers of the underlying layers that have been wound normally, such as an n-th layer and layers below such layer.

The present disclosure has been made in view of the foregoing, and exemplary embodiments relate to providing a tank production system and method that can suppress peeling of the normally wound fibers when fibers that have not been wound at a predetermined position are attempted to be peeled off.

According to the present disclosure, there is provided a tank production system for forming a plurality of fiber layers by winding fibers on the outer periphery of a liner, including a rotation unit configured to rotate the liner; a storage unit configured to have recorded thereon the number of revolutions of the liner; and a detection unit configured to detect abnormality in the position of the fibers wound on the outer periphery of the liner. The rotation unit is configured to, when abnormality in the position of the fibers is detected by the detection unit, refer to the number of revolutions of the liner recorded in the storage unit and rotate the liner in an opposite direction to a direction in which the fibers are wound, back to the number of revolutions of the liner at a point when the winding of fibers to form a fiber layer, which includes the fibers detected to be at the abnormal position, has started.

The tank production system of the present disclosure with the aforementioned configuration can form a plurality of fiber layers by rotating the liner with the rotation unit and thus winding fibers on the outer periphery of the liner. In addition, the number of revolutions of the liner measured with the rotation unit is sent from the rotation unit to the storage unit so as to be recorded in the storage unit. The rotation unit continues the rotation of the liner in the forward direction unless abnormality occurs in the position of the fibers wound on the outer periphery of the liner. Accordingly, fibers are repeatedly wound on the outer periphery of the liner, and thus a plurality of fiber layers are formed.

When abnormality occurs in the position of the fibers wound on the outer periphery of the liner, the abnormality is detected by the detection unit. When the abnormality is detected by the detection unit, the rotation unit refers to the number of revolutions of the liner recorded in the storage unit. Then, the rotation unit rotates the liner in an opposite direction to the direction in which the fibers are wound, back to the number of revolutions of the liner at a point when the winding of fibers to form a fiber layer, which includes the fibers detected to be at the abnormal position, has started.

Accordingly, of the plurality of fiber layers wound on the outer periphery of the liner, only the fibers that form the fiber layer, which includes the fibers detected to be at the abnormal position, can be selectively peeled off from the outer periphery of the liner. Therefore, according to the tank production system of the present disclosure, peeling of the normally wound fibers can be suppressed when fibers that have not been wound at a predetermined position are attempted to be peeled off.

In the tank production apparatus of the present disclosure, the rotation unit can be configured to, when abnormality in the position of the fibers is detected by the detection unit, rotate the liner in the opposite direction by the number of times corresponding to the difference between the total number of revolutions of the liner and the number of revolutions of the liner at a point when the winding of the fibers to form the fiber layer, which includes the fibers detected to be at the abnormal position, has started.

More specifically, the rotation unit can include, for example, a rotation supporting portion that rotates the liner, and a control unit that controls the rotation supporting portion. The rotation supporting portion can include, for example, a shaft that rotatably supports the liner about an axis, an air motor that rotates the shaft about the axis, and a measuring unit that measures the number of revolutions of the shaft. The control unit can include, for example, a computing unit, such as a central processing unit, a storage unit, such as a memory or a hard disk, and an input/output unit that receives and outputs signals.

The rotation unit stops the rotation of the liner upon receiving a signal about abnormality in the position of the fibers from the detection unit, for example. Then, the rotation unit, for example, refers to the number of revolutions of the liner recorded in the storage unit, and acquires from the storage unit the total number of revolutions of the liner at a point when the rotation of the liner has stopped and the number of revolutions of the liner at a point when the winding of fibers to form a fiber layer, which includes the fibers detected to be at the abnormal position, has started. Further, the rotation unit calculates the difference between the acquired total number of revolutions of the liner and the number of revolutions of the liner at a point when the winding of the fibers to form the fiber layer, which includes the fibers detected to be at the abnormal position, has started. Then, the rotation unit rotates the liner in an opposite direction to the direction in which the fibers are wound on the outer periphery of the liner on the basis of the calculated difference in the number of revolutions.

Accordingly, the rotation of the liner in the opposite direction by the rotation unit can be stopped at a point when the fibers wound on the outer periphery of the liner have been peeled off up to the start position for winding of fibers to form a fiber layer that includes the fibers detected to be at the abnormal position. Therefore, according to the tank production system of the present disclosure, it is possible to suppress peeling of the normally wound fibers when fibers that have not been wound at a predetermined position are attempted to be peeled off.

The tank production system of the present disclosure may further include a fiber collecting unit configured to collect fibers peeled off from the outer periphery of the liner when the rotation unit is rotated in the opposite direction, and the fiber collecting unit may include a take-up portion configured to be rotated by an air motor and take up the fibers. Accordingly, even when the lengths of the fibers wound on the outer periphery of the liner when the liner rotates once differ from one another such as when the fibers are wound helically, for example, tension that is applied upon peeling of the fibers can be made roughly constant. Therefore, the cutting of the fibers when they are peeled off from the outer periphery of the liner can be suppressed.

The tank production method of the present disclosure is a tank production method for forming a plurality of fiber layers by winding fibers on the outer periphery of a liner, including rotating the liner while recording the number of revolutions of the liner so as to detect abnormality in the position of the fibers wound on the outer periphery of the liner; and rotating, when abnormality in the position of the fibers is detected, the liner in an opposite direction to a direction in which the fibers are wound, back to the number of revolutions of the liner at a point when the winding of fibers to form a fiber layer, which includes the fibers detected to be at the abnormal position, has started.

As described above, rotating the liner can wind fibers on the outer periphery of the liner and thus can form a plurality of fiber layers. Unless abnormality occurs in the position of the fibers wound on the outer periphery of the liner, fibers are repeatedly wound on the outer periphery of the liner, and thus a plurality of fiber layers are formed. Meanwhile, when abnormality occurs in the position of the fibers wound on the outer periphery of the liner, the rotation of the liner is stopped. Then, the recorded number of revolutions of the liner is referred to so that the liner is rotated in an opposite direction to the direction in which the fibers are wound, back to the number of revolutions of the liner at a point when the winding of fibers to form a fiber layer, which includes the fibers detected to be at the abnormal position, has started.

Accordingly, of the plurality of fiber layers wound on the outer periphery of the liner, only the fibers that form a fiber layer, which includes the fibers detected to be at the abnormal position, can be selectively peeled off from the outer periphery of the liner. Therefore, according to the tank production system of the present disclosure, peeling of the normally wound fibers can be suppressed when fibers that have not been wound at a predetermined position are attempted to be peeled off.

According to the present disclosure, a tank production system and method can be provided that can suppress peeling of the normally wound fibers when fibers that have not been wound at a predetermined position are attempted to be peeled off.

DETAILED DESCRIPTION

Hereinafter, embodiments of a tank production system and method in accordance with the present disclosure will be described with reference to the drawings. In the following, an embodiment of a tank production system will be described first, and then, an embodiment of a tank production method that uses the production system will be described.

[Tank Production System]

Figure 1:
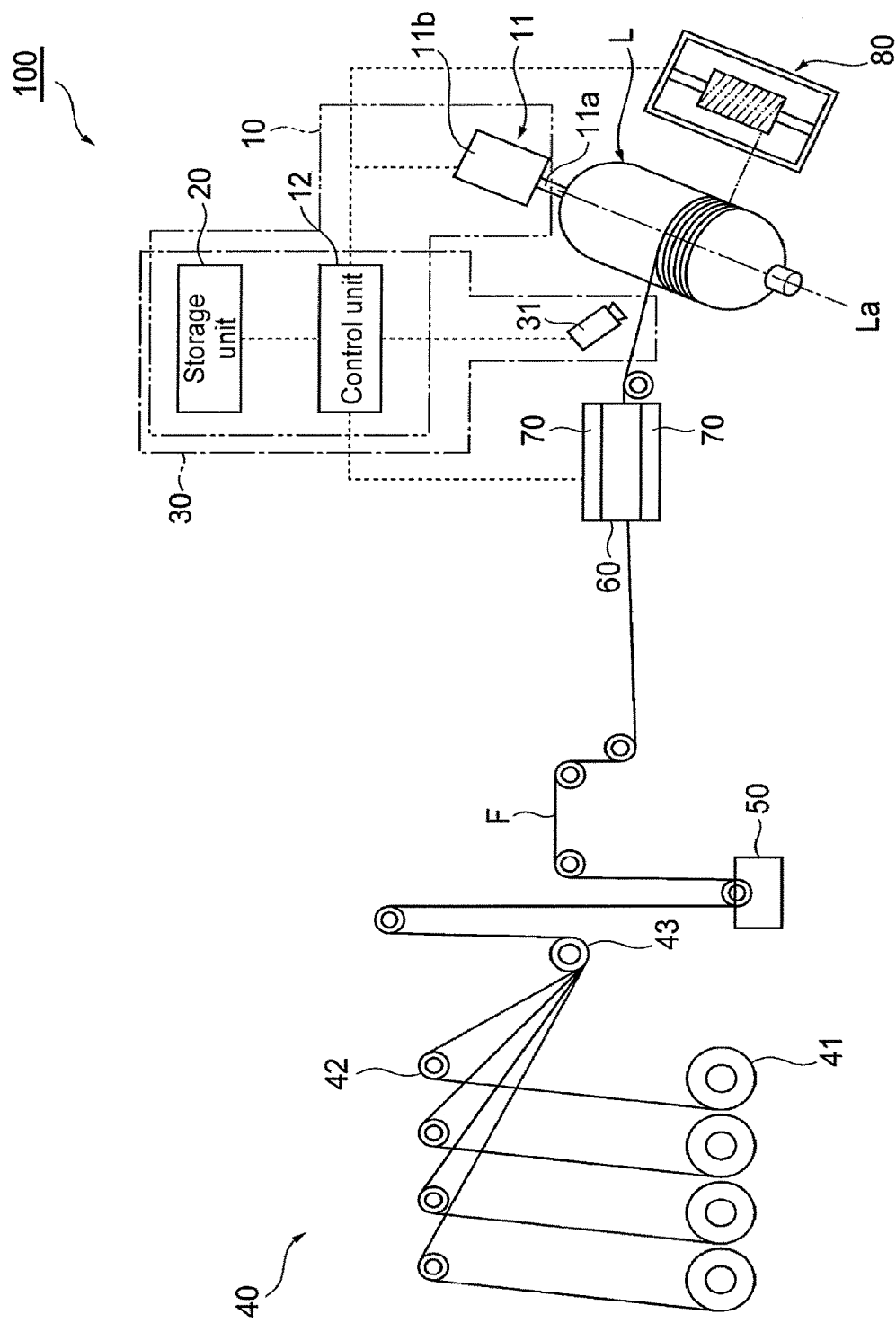
FIG. 1 is a schematic view of a tank production system in accordance with an embodiment of the present disclosure.

FIG. 1 is a schematic view of a tank production system 100 in accordance with an embodiment of the present disclosure. The tank production system 100 in this embodiment is a system for forming a plurality of fiber layers by winding fibers F on the outer periphery of a liner L that forms an inner layer of a tank. The details will be described below, but the tank production system 100 in this embodiment has the following features.

The tank production system 100 in this embodiment mainly includes a rotation unit 10 that rotates the liner L, a storage unit 20 adapted to have recorded thereon the number of revolutions of the liner L, and a detection unit 30 that detects abnormality in the position of the fibers F wound on the outer periphery of the liner L. The rotation unit 10 is configured to, when abnormality in the position of the fibers F is detected by the detection unit 30, refer to the number of revolutions of the liner L recorded in the storage unit 20. In addition, the rotation unit 10 is configured to rotate the liner L in an opposite direction to the direction in which the fibers F are wound, back to the number of revolutions of the liner L at a point when the winding of fibers F to form a fiber layer, which includes the fibers F detected to be at the abnormal position, has started.

Hereinafter, the tank production system 100 in this embodiment will be described in more detail. The tank production system 100 can include, for example, a fiber supply unit 40, a resin impregnation unit 50, a winding unit 60, a heating unit 70, and a fiber collecting unit 80 in addition to the aforementioned rotation unit 10, storage unit 20, and detection unit 30. The fiber supply unit 40 includes a plurality of bobbins 41, a plurality of conveyor rollers 42, and a binding roller 43, for example.

Each bobbin 41 has wound on its core reinforcing fibers such as carbon fibers or glass fibers that are the fibers F to be wound on the outer periphery of the liner L, for example. Each conveyor roller 42 is adapted to have passed thereon the fibers F that have been wound off the bobbin 41, and send the fibers F to the binding roller 43. The binding roller 43 adjusts the plurality of fibers F sent off from the plurality of conveyor rollers 42 and sends them off to the resin impregnation unit 50.

The resin impregnation unit 50 includes, for example, a resin vessel that stores uncured thermosetting resin, such as uncured epoxy resin. The resin impregnation unit 50 allows bundlers of the fibers F, which have been adjusted and sent off from the binding roller 43, to pass through uncured thermosetting resin in the resin vessel so that the fibers F are impregnated with the thermosetting resin.

The winding unit 60 is, for example, a mechanism of adjusting the fibers F impregnated with the thermosetting resin and guiding the fibers F to the outer periphery of the liner L, and is commonly referred to as "Aikuchi" ("abutment") portion. The heating unit 70 is integrally provided with the winding unit 60, for example, and heats the fibers F sent to the winding unit 60 using a high-frequency coil so that the temperature of the fibers F is increased to a temperature of less than or equal to 100° C. at which the thermosetting resin impregnating the fibers F does not cure.

In the example shown in FIG. 1, the rotation unit 10 includes a rotation supporting portion 11, a control unit 12, and a storage unit 20, for example. The rotation supporting portion 11 includes, for example, a shaft 11a that rotatably supports the liner L, an air motor 11b that rotates the shaft 11a, and a measuring unit (not shown) that measures the number of revolutions of the shaft 11a. The shaft 11a is inserted through an opening of the liner L in the direction of the axis La of the liner L, for example, and rotatably supports the liner L about the axis La. The measuring unit includes an encoder for example, and measures the number of revolutions of the shaft 11a to measure the number of revolutions of the liner L. The number of revolutions of the liner L measured by the measuring unit is stored in the storage unit 20.

The storage unit 20 includes a memory or a hard disk, for example. The storage unit 20 is controlled by the control unit 12, for example, and is adapted to have recorded thereon the number of revolutions of the liner L measured by the measuring unit. The number of revolutions of the liner L recorded in the storage unit 20 is read by the control unit 12. In addition, the storage unit 20 has stored therein in advance the number of revolutions of the liner L to form each of a plurality of fiber layers on the outer periphery of the liner L. Specifically, the numbers of revolutions of the liner L to form the fiber layers, for example, 20 revolutions, 20 revolutions, 20 revolutions, and 20 revolutions are stored in the storage unit 20 as the numbers of revolutions of the liner L to form the first to fourth fiber layers, respectively. It should be noted that the number of fiber layers to be formed is not particularly limited, and the number of revolutions of the liner L to form the respective fiber layers may be made different from one another.

In addition, the storage unit 20 has recorded thereon in advance a preset reference position of the fibers F relative to the liner L, for example. The reference position includes the winding start position and the winding end position for forming each of a plurality of fiber layers on the outer periphery of the liner L. In addition, the storage unit 20 includes programs for controlling the fiber supply unit 40, the resin impregnation unit 50, the winding unit 60, the heating unit 70, the detection unit 30, the storage unit 20, and the rotation supporting portion 11, for example. Such programs are executed by the control unit 12, for example.

The detection unit 30 includes an infrared camera 31, the storage unit 20, and the control unit 12, for example. The detection unit 30 acquires the temperatures of the liner L and the fibers F wound on the outer periphery of the liner L, and detects the position of the fibers F wound on the outer periphery of the liner L relative to the liner L on the basis of the acquired temperatures. The detection unit 30 detects, among the fibers F wound on the liner L, the position of the fibers F of the outermost layer from an end of the liner L in the direction of the axis La, for example. The detection unit 30 compares, for example, the reference position of the fibers F relative to the liner L recorded on the storage unit 20 with the detected position of the fibers F relative to the liner L, and detects that the position of the fibers F wound on the outer periphery of the liner L is abnormal if there is an error of greater than or equal to a predetermined value between the two positions.

The control unit 12 can include, for example, a computing unit, such as a central processing unit, a storage unit, such as a memory or a hard disk, and an input/output unit that receives and outputs signals, though not shown. The control unit 12, for example, executes the programs stored in the storage unit 20 and controls the fiber supply unit 40, the resin impregnation unit 50, the winding unit 60, the heating unit 70, the detection unit 30, and the rotation supporting portion 11. Accordingly, the tank production system 100 in this embodiment is configured such that it can wind the fibers F on the outer periphery of the liner L in a variety of ways, such as helical winding, hoop winding, or combined winding.

In the tank production system 100 in this embodiment, the rotation unit 10 is configured to, when abnormality in the position of the fibers F is detected by the detection unit 30, rotate the liner L in an opposite direction to the forward rotation direction in which the fibers F are wound on the outer periphery of the liner L. At this time, the rotation unit 10 is configured to rotate the liner L in the opposite direction by the number of times corresponding to the difference between the total number of revolutions of the liner L and the number of revolutions of the liner L at a point when the winding of fibers F to form a fiber layer, which includes the fibers F detected to be at the abnormal position, has started.

Figure 2:
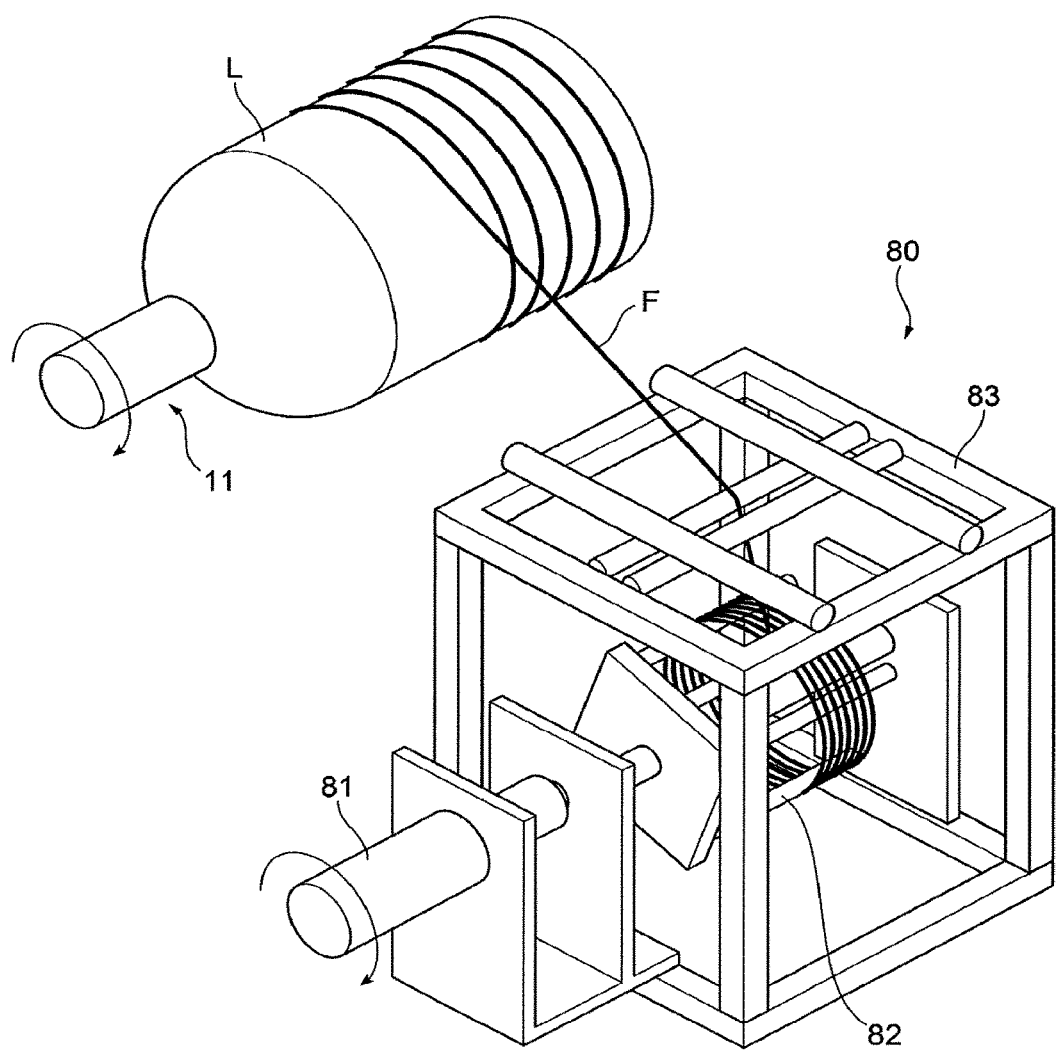
FIG. 2 is a schematic view of a fiber collecting unit shown in FIG. 1.

FIG. 2 is a schematic view of the fiber collecting unit 80 shown in FIG. 1. The tank production system 100 in this embodiment can include, for example, the fiber collecting unit 80 that collects the fibers F peeled off from the outer periphery of the liner L when the rotation unit 10 is rotated in an opposite direction to the direction in which the fibers F are wound on the outer periphery of the liner L. The fiber collecting unit 80 includes, for example, an air motor 81 that is rotated under the control of the control unit 12, a take-up portion 82 that is rotated by the air motor 81 and takes up the fibers F peeled off from the outer periphery of the liner L, and a frame portion 83 that supports them.

[Tank Production Method]

Figure 3:
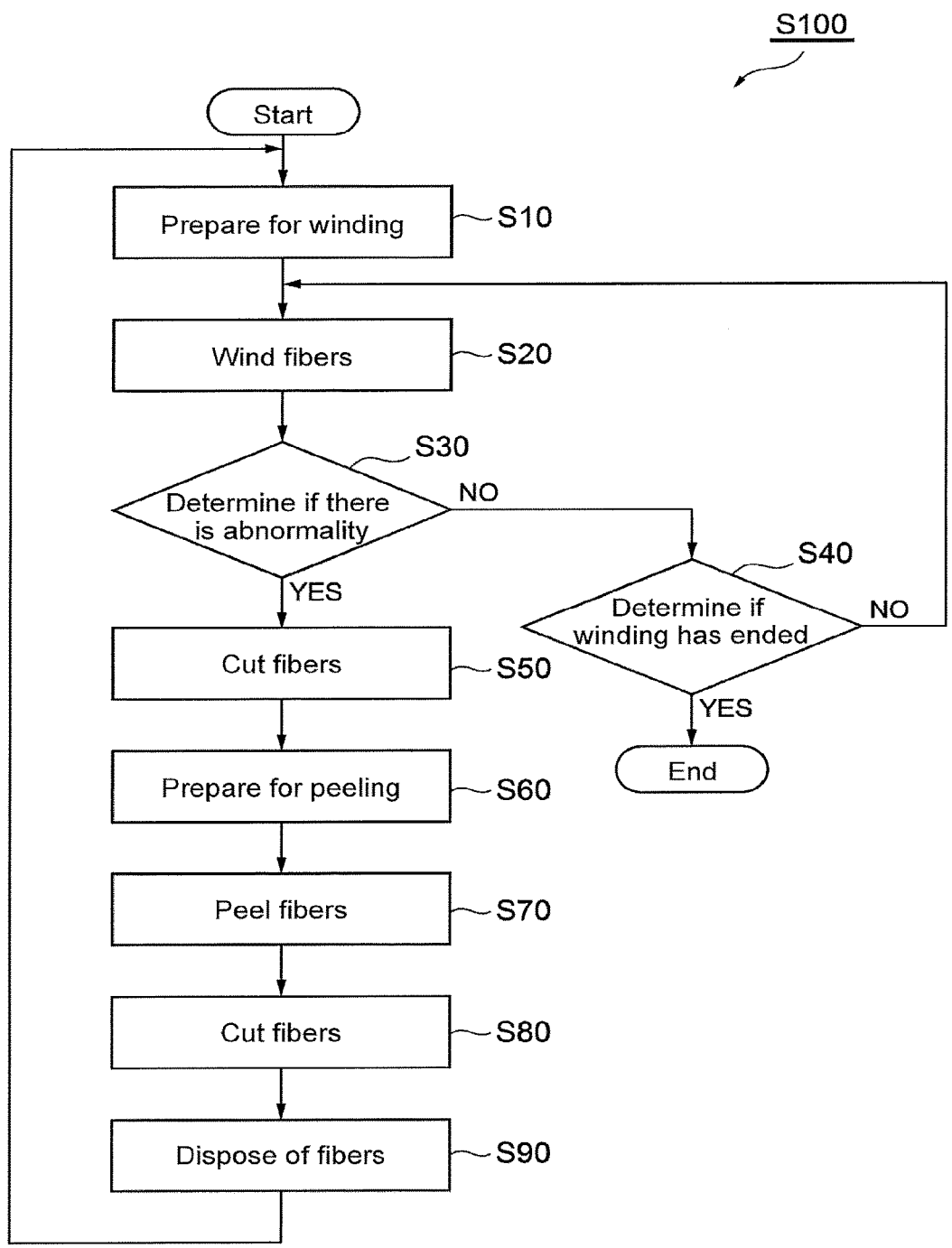
FIG. 3 is a flowchart of a tank production method in accordance with an embodiment of the present disclosure.

Hereinafter, a tank production method that uses the tank production system 100 in this embodiment will be described in conjunction with the operation of the tank production system 100. FIG. 3 is a flowchart of a tank production method S100 in accordance with an embodiment of the present disclosure.

The tank production method S100 in this embodiment is a method of forming a plurality of fiber layers by winding fibers F on the outer periphery of the liner L, and can be performed using the aforementioned tank production system 100 in this embodiment. The tank production method S100 in this embodiment includes the following two steps. One is a step of detecting abnormality in the position of the fibers F wound on the outer periphery of the liner L by rotating the liner L while recording the number of revolutions of the liner L (S20, S30). The other is a step of, when abnormality in the position of the fibers F is detected, rotating the liner L in an opposite direction to the direction in which the fibers F are wound, back to the number of revolutions of the liner L at a point when the winding of fibers F to form a fiber layer, which includes the fibers F detected to be at the abnormal position, has started (S70). Hereinafter, the tank production method S100 in this embodiment will be described specifically and in more detail.

The tank production method S100 in this embodiment can include, for example, a winding preparation step S10, a fiber winding step S20, an abnormality determination step S30, an end determination step S40, a fiber cutting step S50, a peeling preparation step S60, a fiber peeling step S70, a fiber cutting step S80, and a fiber disposal step S90.

(Winding Preparation Step)

In the winding preparation step S10, the liner L that forms an inner layer of a tank is rotatably supported by the rotation supporting portion 11 of the rotation unit 10. In addition, fibers F impregnated with thermosetting resin supplied from the fiber supply unit 40 are prepared such that the fibers F can be wound on the outer periphery of the liner L by the winding unit 60. After the winding preparation step S10, the fiber winding step S20 is performed as shown in FIG. 3.

(Fiber Winding Step)

Figure 4:
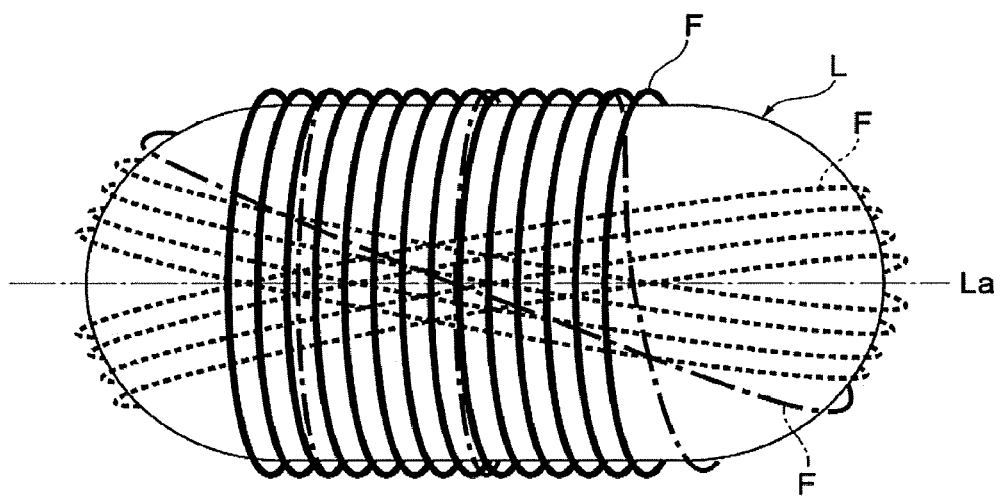
FIG. 4 is a schematic view showing an exemplary method of winding fibers in a fiber winding step shown in FIG. 3.

FIG. 4 is a schematic view showing an exemplary method of winding the fibers F on the outer periphery of the liner L in the fiber winding step S20. In FIG. 4, hoop-wound fibers F are indicated by the solid line, helically wound fibers F are indicated by the dashed line, and fibers F that are wound through combined winding are indicated by the alternate long and short dash line. In the fiber winding step S20, the fiber supply unit 40, the winding unit 60, and the rotation unit 10 are controlled by the control unit 12, and the liner L is rotated while the number of revolutions of the liner L is recorded on the storage unit 20 by control unit 12. The control unit 12 rotates the liner L in accordance with the number of revolutions of the liner L to form each of a plurality of fiber layers that has been recorded on the storage unit 20 in advance, and winds the fibers F impregnated with thermosetting resin on the outer periphery of the liner L using a variety of winding methods.

More specifically, for example, the liner L is rotated about the axis La 20 times by the rotation unit 10 while the fibers F are supplied by the fiber supply unit 40 and are guided to a predetermined position on the outer periphery of the liner L by the winding unit 60. Accordingly, the fibers F impregnated with the thermosetting resin are wound 20 times through hoop winding, for example, from the winding start position to the winding end position for forming a first fiber layer on the outer periphery of the liner L. As described above, the abnormality determination step S30 is performed in predetermined periods while the fibers F are wound from the winding start position to the winding end position for forming the first fiber layer on the outer periphery of the liner L.

(Abnormality Determination Step)

In the abnormality determination step S30, the liner L is rotated while the number of revolutions of the liner L is recorded so that abnormality in the position of the fibers F wound on the outer periphery of the liner L is detected. Specifically, for example, the detection unit 30 compares the reference position of the fibers F relative to the liner L recorded on the storage unit 20 with the detected position of the fibers F relative to the liner L. If the error is less than or equal to a predetermined value, the detection unit 30 does not detect abnormality (NO) and the end determination step S40 is performed. Meanwhile, if the error is greater than the predetermined value, the detection unit 30 detects that the position of the fibers F wound on the outer periphery of the liner L is abnormal (YES), and the fiber cutting step S50 is performed.

(End Determination Step)

In the end determination step S40, for example, the control unit 12 determines whether the winding of the fibers F on the outer periphery of the liner L has ended or not. The determination of the end can be performed by, for example, determining, with the control unit 12, whether the number of revolutions of the liner L recorded on the storage unit 20 has reached the number of revolutions of the liner L to form each fiber layer stored in the storage unit 20 in advance. If it is determined that the winding of the fibers F on the outer periphery of the liner L has not ended in the end determination step S40 (NO), the fiber winding step S20 is continued.

(Fiber Winding Step)

In the fiber winding step S20, when the number of revolutions of the liner L has reached the number of revolutions of the liner L to form the first fiber layer stored in the storage unit 20 in advance and the winding of the fibers F on the outer periphery of the liner L up to the winding end position for forming the first fiber layer has ended, the winding of fibers to form a second fiber layer is started. The second fiber layer is formed by winding fibers F impregnated with thermosetting resin on the outer periphery of the liner L 20 times through hoop winding, for example, from the winding start position for forming the second fiber layer, which corresponds to the winding end position for forming the first fiber layer, to the winding end position for forming the second fiber layer set in advance. At this time, the control unit 12 rotates the liner L until the number of revolutions of the liner L reaches the number of revolutions of the liner L to form the second fiber layer stored in the storage unit 20 in advance. That is, in order to wind fibers to form the second fiber layer, the rotation unit 10 rotates the liner L about the axis La 20 times, for example. In this period, the aforementioned abnormality determination step S30 and the end determination step S40 are also performed periodically, for example.

In the fiber winding step S20, when the number of revolutions of the liner L has reached the number of revolutions of the liner L to form the second fiber layer stored in the storage unit 20 in advance and the winding of the fibers F on the outer periphery of the liner L up to the winding end position for forming the second fiber layer has ended, the winding of a third fiber layer is started. The third fiber layer is formed by winding fibers F impregnated with thermosetting resin on the outer periphery of the liner L 20 times through helical winding, for example, from the winding start position for forming the third fiber layer, which corresponds to the winding end position for forming the second fiber layer, to the winding end position for forming the third fiber layer set in advance. At this time, the control unit 12 rotates the liner L until the number of revolutions of the liner L reaches the number of revolutions of the liner L to form the third fiber layer stored in the storage unit 20 in advance. That is, in order to wind fibers to form the third fiber layer, the rotation unit 10 rotates the liner L about the axis La 20 times, for example. In this period, the aforementioned abnormality determination step S30 and end determination step S40 are also performed periodically, for example.

In the fiber winding step S20, when the number of revolutions of the liner L has reached the number of revolutions of the liner L to form the third fiber layer stored in the storage unit 20 in advance and the winding of the fibers F on the outer periphery of the liner L up to the winding end position for forming the third fiber layer has ended, the winding of a fourth fiber layer is started. The fourth fiber layer is formed by winding fibers F impregnated with thermosetting resin on the outer periphery of the liner L 20 times through helical winding, for example, from the winding start position for forming the fourth fiber layer, which corresponds to the winding end position for forming the third fiber layer, to the winding end position for forming the fourth fiber layer set in advance. At this time, the control unit 12 rotates the liner L until the number of revolutions of the liner L reaches the number of revolutions of the liner L to form the fourth fiber layer stored in the storage unit 20 in advance. That is, in order to wind fibers to form the fourth fiber layer, the rotation unit 10 rotates the liner L about the axis La 20 times. In this period, the aforementioned abnormality determination step S30 and end determination step S40 are also performed periodically, for example.

For example, when the number of revolutions of the liner L has reached the number of revolutions of the liner L to form the fourth fiber layer stored in the storage unit 20 in advance, and the fibers F have been wound up to the winding end position for forming the fourth fiber layer, and thus the winding of the fibers F on the outer periphery of the liner L is determined to have ended in the end determination step S40 (YES), the fiber winding step S20 ends. Accordingly, four fiber layers including the first to fourth fiber layers are formed in a stacked manner on the outer periphery of the liner L. As described above, according to the production system and method in this embodiment, as the liner L is rotated by the rotation unit 10, the fibers F can be wound on the outer periphery of the liner L, and thus a plurality of fiber layers can be formed.

By the way, suppose that while the third fiber layer is formed in the fiber winding step S20, abnormality is determined in the abnormality determination step S30 (YES) when the liner L has rotated five times from the winding start position for forming the third fiber layer. Then, the control unit 12 stops the rotation of the liner L by the rotation unit 10. After that, the fiber cutting step S50 is performed, for example.

(Fiber Cutting Step)

The fiber cutting step S50 is a step of cutting the fibers F between the liner L and the winding unit 60. The cutting of the fibers F in the fiber cutting step S50 may be performed either manually by an operator or automatically by a cutting apparatus. After the termination of the fiber cutting step S50, the peeling preparation step S60 is performed, for example.

(Peeling Preparation Step)

The peeling preparation step S60 is a step of passing ends of the fibers F extending from the outermost fiber layer wound on the outer periphery of the liner L, which have been cut in the fiber cutting step S50, to the take-up portion 82 of the fiber collecting unit 80 so as to allow the fibers F to be taken up by the fiber collecting unit 80. The peeling preparation step S60 can be performed either manually by an operator or automatically by an automated machine such as an industrial robot, for example. After the termination of the peeling preparation step S60, the fiber peeling step S70 is performed, for example.

(Fiber Peeling Step)

The fiber peeling step S70 is a step of, when abnormality in the position of the fibers F is detected in the abnormality determination step S30, rotating the liner L in an opposite direction to the direction in which the fibers F are wound, back to the number of revolutions of the liner L at a point when the winding of fibers F to form a fiber layer, which includes the fibers F detected to be at the abnormal position, has started. More specifically, for example, if abnormality is determined in the abnormality determination step S30 at a point when the liner L has rotated five times from the winding start position for forming the third fiber layer, for example, the rotation unit 10 rotates the liner L in an opposite direction to the direction in which the fibers F are wound five times.

More specifically, when abnormality occurs in the position of the fibers F wound on the outer periphery of the liner L, the abnormality is detected by the detection unit 30, and a signal about the abnormality is sent from the detection unit 30 to the rotation unit 10. The rotation unit 10, upon receiving the signal about the abnormality in the position of the fibers F from the detection unit 30, for example, stops the rotation of the liner L and acquires from the storage unit 20 the total number of revolutions of the liner L recorded on the storage unit 20 as well as the number of revolutions of the liner L at a point when the winding of fibers F to form the third fiber layer, which includes the fibers F detected to be at the abnormal position, has started. Further, the rotation unit 10 calculates the difference between the acquired total number of revolutions of the liner L and the number of revolutions of the liner L at a point when the winding of fibers F to form the third fiber layer, which includes the fibers F detected to be at the abnormal position, has started. Then, the rotation unit 10 rotates the liner L in an opposite direction to the direction in which the fibers F are wound on the outer periphery of the liner L on the basis of the calculated difference in the number of revolutions.

For example, suppose that the detection unit 30 detects abnormality in the position of the fibers F after the liner L has rotated five times from the start of winding of the fibers F to form the third fiber layer as described above. At this time, the rotation unit 10 acquires 45 revolutions as the total number of revolutions of the liner L as of when the abnormality was detected and acquires 40 revolutions as the number of revolutions of the liner L at a point when the winding of fibers F to form the third fiber layer, which includes the fibers F detected to be at the abnormal position, has started.

The rotation unit 10 further determines that the difference between 45 revolutions, which is the total number of revolutions of the liner L, and 40 revolutions, which is the number of revolutions of the liner L at a point when the winding of the fibers F to form the third fiber layer has started, is 5 revolutions. Herein, the number of revolutions of the liner L at a point when the winding of the fibers F to form the third fiber layer has started can be calculated by, for example, referring to, with the control unit 12, the number of revolutions of the liner L to form the first fiber layer and the number of revolutions of the liner L to form the second fiber layer stored in the storage unit 20. Next, the rotation unit 10 rotates the liner L in an opposite direction to the direction in which the fibers F are wound five times that have been determined through the calculation. That is, the rotation unit 10 rotates liner L, which has been rotated in the forward direction 45 times to wind the fibers F, in an opposite direction thereto 5 times so as to return the liner L back to 40 revolutions.

Accordingly, for example, the rotation of the liner L in the opposite direction by the rotation unit 10 can be stopped at a point when the fibers F wound on the outer periphery of the liner L have been peeled off up to the winding start position for forming the third fiber layer that includes the fibers F detected to be at the abnormal position. Therefore, according to the tank production system 100 in this embodiment, peeling of the normally wound fibers F can be suppressed when fibers F that have not been wound at a predetermined position are attempted to be peeled off.

It should be noted that the rotation unit 10 may also be configured to reset the total number of revolutions of the liner L each time a fiber layer is formed. In such a case, the rotation unit 10 determines the number of revolutions of the liner L from the start of winding of fibers F to form a fiber layer, which includes fibers F detected to be at an abnormal position, and rotates the liner L in an opposite direction to the direction in which the fibers F are wound, by the number of times corresponding to the determined number of revolutions of the liner L. Specifically, if abnormality in the position of the fibers F is detected after the liner L has rotated five times from the start of winding of the fibers F to form the third fiber layer, the rotation unit 10 rotates the liner L in an opposite direction to the direction in which the fibers F are wound 5 times.

In addition, in the fiber peeling step S70, for example, the fiber collecting unit 80 may collect the fibers F peeled off from the outer periphery of the liner L when the rotation unit 10 is rotated in an opposite direction to the direction in which the fibers F are wound on the outer periphery of the liner L by the rotation unit 10. Herein, the fiber collecting unit 80 in this embodiment has the take-up portion 82 that is rotated by the air motor 81 and takes up the fibers F. Accordingly, even if the lengths of the fibers F wound on the outer periphery of the liner L when the liner L rotates once differ from one another such as when the fibers F are wound helically, for example, tension that is applied upon peeling of the fibers F can be made roughly constant. Therefore, cutting of the fibers F when they are peeled off from the outer periphery of the liner L can be suppressed. After the termination of the fiber peeling step S70, the second fiber cutting step S80 is performed, for example.

(Fiber Cutting Step)

The second fiber cutting step S80 performed after the termination of the fiber peeling step S70 is a step of cutting the fibers F between the fiber collecting unit 80 and the outer periphery of the liner L. Cutting of the fibers F in the second fiber cutting step S80 may be performed either manually by an operator or automatically by a cutting apparatus, for example, as in the first fiber cutting step S50 performed before the peeling preparation step S60. After the termination of the second fiber cutting step S80, the fiber disposal step S90 is performed, for example.

(Fiber Disposal Step)

The fiber disposal step S90 is a step of, for example, disposing of the fibers F that have been peeled off from the outer periphery of the liner L in the fiber peeling step S70 and cut in the fiber cutting step S80. It should be noted that the fibers F that are disposed of in the fiber disposal step S90 may also be used for a recycling step from the perspective of effectively utilizing resources. After the termination of the fiber disposal step S90, the aforementioned winding preparation step S10, fiber winding step S20, abnormality determination step S30, and end determination step S40 are performed.

As described above, according to the tank production system 100 and the tank production method S100 in this embodiment, a plurality of fiber layers can be formed by rotating the liner L and thus winding the fibers F on the outer periphery of the liner L. Meanwhile, unless abnormality occurs in the position of the fibers F wound on the outer periphery of the liner L, the fibers F are repeatedly wound on the outer periphery of the liner L so that a plurality of fiber layers are formed. If abnormality occurs in the position of the fibers F wound on the outer periphery of the liner L, the rotation of the liner L is stopped. Then, the recorded number of revolutions of the liner L is referred to so that the liner L is rotated in an opposite direction to the direction in which the fibers F are wound, back to the number of revolutions of the liner L at a point when the winding of fibers F to form a fiber layer, which includes the fibers F detected to be at the abnormal position, has started.

Accordingly, of the plurality of fiber layers wound on the outer periphery of the liner L, only the fibers F that form the fiber layer, which includes the fibers F detected to be at the abnormal position, can be selectively peeled off from the outer periphery of the liner L. Therefore, according to the tank production system 100 and the tank production method S100 in this embodiment, peeling of the normally wound fibers F can be suppressed when fibers F that have not been wound at a predetermined position are attempted to be peeled off.

Although the embodiments of the present disclosure have been described in detail above with reference to the drawings, specific configurations are not limited thereto. Therefore, any design changes and the like that fall within the spirit and scope of the present disclosure are all included in the present disclosure.

DESCRIPTION OF SYMBOLS

10 Rotation unit
20 Storage unit
30 Detection unit
80 Fiber collecting unit
81 Air motor
82 Take-up portion
100 Tank production system
F Fibers
L Liner
S100 Tank production method

What is claimed is:

1. A tank production system for forming a plurality of fiber layers by winding fibers on an outer periphery of a liner, comprising:
a rotation unit configured to rotate the liner;
a storage unit configured to have recorded thereon the number of revolutions of the liner; and
a detection unit configured to detect abnormality in a position of the fibers wound on the outer periphery of the liner,
wherein:
the rotation unit is configured to, when abnormality in the position of the fibers is detected by the detection unit, refer to the number of revolutions of the liner recorded on the storage unit and rotate the liner in an opposite direction to a direction in which the fibers are wound, back to the number of revolutions of the liner at a point when the winding of fibers to form a fiber layer, which includes the fibers detected to be at the abnormal position, has started.

2. The tank production system according to claim 1, wherein the rotation unit is configured to, when abnormality in the position of the fibers is detected by the detection unit, rotate the liner in the opposite direction by the number of times corresponding to a difference between the total number of revolutions of the liner and the number of revolutions of the liner at a point when the winding of the fibers to form the fiber layer, which includes the fibers detected to be at the abnormal position, has started.

3. The tank production system according to claim 1, further comprising a fiber collecting unit configured to collect fibers peeled off from the outer periphery of the liner when the rotation unit is rotated in the opposite direction, wherein:

the fiber collecting unit includes a take-up portion configured to be rotated by an air motor and take up the fibers.

4. A tank production method for forming a plurality of fiber layers by winding fibers on an outer periphery of a liner, comprising:

rotating the liner while recording the number of revolutions of the liner so as to detect abnormality in a position of the fibers wound on the outer periphery of the liner; and rotating, when abnormality in the position of the fibers is detected, the liner in an opposite direction to a direction in which the fibers are wound, back to the number of revolutions of the liner at a point when the winding of fibers to form a fiber layer, which includes the fibers detected to be at the abnormal position, has started.

* * * * *